United States Patent
Liu et al.

(10) Patent No.: US 12,017,205 B2
(45) Date of Patent: Jun. 25, 2024

(54) PRECIOUS METAL CATALYSTS FABRICATED USING REVERSE LOADING AND METAL SHUTTLING

(71) Applicant: University of Central Florida Research Foundation, Inc., Orlando, FL (US)

(72) Inventors: Fudong Liu, Orlando, FL (US); Shaohua Xie, Orlando, FL (US)

(73) Assignee: University of Central Florida Research Foundation, Inc., Orlando, FL (US)

(*) Notice: Subject to any disclaimer, the term of this patent is extended or adjusted under 35 U.S.C. 154(b) by 142 days.

(21) Appl. No.: 17/152,158

(22) Filed: Jan. 19, 2021

(65) Prior Publication Data
US 2021/0220802 A1  Jul. 22, 2021

Related U.S. Application Data

(60) Provisional application No. 62/962,423, filed on Jan. 17, 2020.

(51) Int. Cl.
| | |
|---|---|
| *B01J 23/63* | (2006.01) |
| *B01J 21/04* | (2006.01) |
| *B01J 37/02* | (2006.01) |
| *B01J 37/08* | (2006.01) |
| *B01J 37/18* | (2006.01) |

(52) U.S. Cl.
CPC ............ *B01J 23/63* (2013.01); *B01J 21/04* (2013.01); *B01J 37/0228* (2013.01); *B01J 37/0244* (2013.01); *B01J 37/088* (2013.01); *B01J 37/18* (2013.01)

(58) Field of Classification Search
CPC ........ B01J 23/63; B01J 21/04; B01J 37/0228; B01J 37/0244; B01J 37/088; B01J 37/18; B01J 35/002; B01J 35/0073; B01J 37/0242; B01J 37/08; B01J 37/16
See application file for complete search history.

(56) References Cited

U.S. PATENT DOCUMENTS

| | | | | |
|---|---|---|---|---|
| 4,624,941 | A * | 11/1986 | Berndt | B01J 37/088 502/302 |
| 8,663,588 | B2 * | 3/2014 | Lindner | B01J 23/63 502/328 |
| 2015/0125370 | A1 * | 5/2015 | Klingmann | B01J 35/04 422/169 |

OTHER PUBLICATIONS

Ganzler et al (Tuning the Pt/CeO2 Interface by in Situ Variation of the Pt Particle Size, ACS Catalysis, 2018) (Year: 2018).*
Farrauto, R.J., "Low-Temperature Oxidation of Methane", Science 337 (6095), pp. 659-660 (2012).
(Continued)

*Primary Examiner* — Colin W. Slifka
*Assistant Examiner* — Logan Edward Laclair
(74) *Attorney, Agent, or Firm* — Suiter Swantz IP

(57) ABSTRACT

A method for fabricating a precious metal catalyst may include depositing a precious metal on a base material to form a catalyst structure, performing a first calcination on the catalyst structure, depositing a metal oxide on the catalyst structure such that the precious metal is at least partially encapsulated by the metal oxide, performing a second calcination on the catalyst structure, and reducing the catalyst structure with a reductive material to induce diffusion of at least a portion of the precious metal to a surface of the metal oxide.

19 Claims, 7 Drawing Sheets

(56) References Cited

OTHER PUBLICATIONS

Ganzler, A.M. et al., "Tuning the Pt/CeO2 Interface by in Situ Variation of the Pt Particle Size", ACS Catal. 8 (6), pp. 4800-4811 (2018).

Jones, J. et al., "Thermally stable single-atom platinum-on-ceria catalysts via atom trapping", Science 353 (6295), pp. 150-154 (2016).

Kurzman, J.A. et al., "Chemistry of precious metal oxides relevant to heterogeneous catalysis", Dalton Trans 42, pp. 14653-15667 (2013).

Lang, R. et al., "Non defect-stabilized thermally stable single-atom catalyst", Nat Commun 10, 234 (2019). https://doi.org/10.1038/s41467-018-08136-3, 10 pages.

Screen, T., "Platinum Group Metal Perovskite Catalysts", Platinum Metals Rev. 51 (2), pp. 87-92 (2007).

"Reduction of Zirconium and Hafnium Oxides", Nature, Sep. 16, 1991, vol. 191, p. 1192.

Huimei Duan et al. "Pentacoordinated Al3+-Stabilized Active Pd Structures on Al2O3-Coated Palladium Catalysts for Methane Combustion", Angew. Chem. Int. Ed. 2019, vol. 58, pp. 12043-12048.

Tzia Ming Onn et al. Improved Thermal Stability and Methan-Oxidation Activity of Pd/Al2O3 Catalysts by Atomic Layer Deposition of ZrO2; ACS Catalysis, ACS Publications 2015 American Chemical Society, pp. 5696-5701.

* cited by examiner

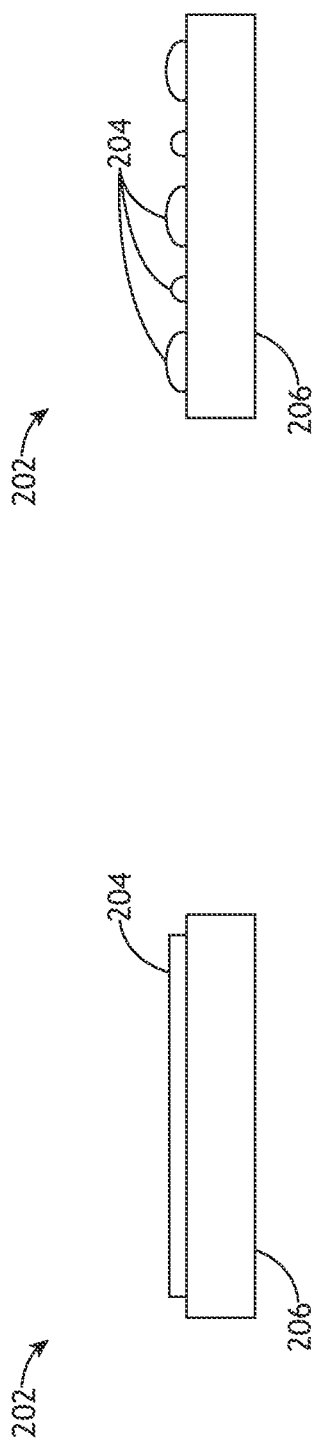

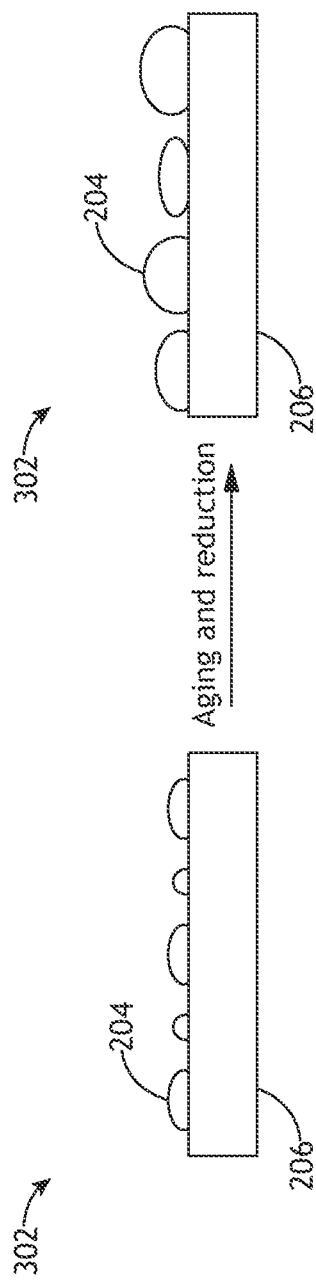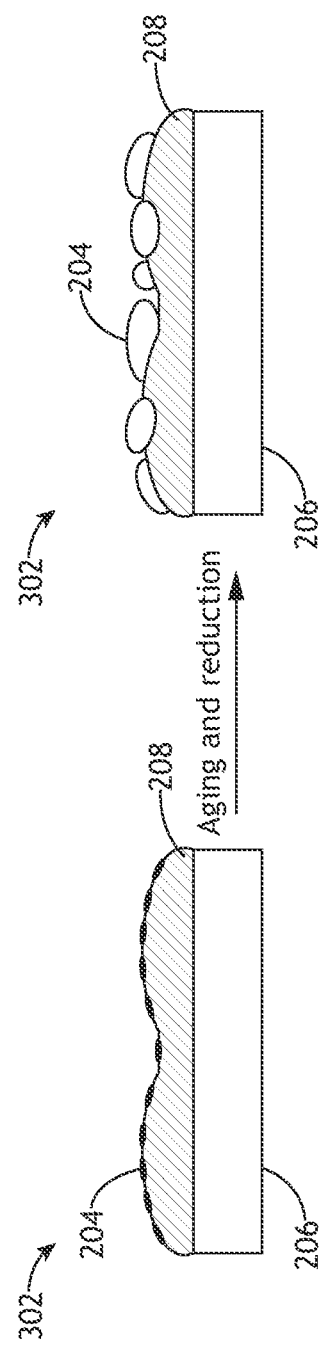

PRECIOUS METAL CATALYSTS FABRICATED USING REVERSE LOADING AND METAL SHUTTLING

CROSS-REFERENCE TO RELATED APPLICATION

The present application claims the benefit under 35 U.S.C. § 119(e) of U.S. Provisional Application Ser. No. 62/962,423, filed Jan. 17, 2020 entitled PRECIOUS METAL CATALYSTS FABRICATED USING REVERSE LOADING AND METAL SHUTTLING, naming Fudong Liu and Shaohua Xie as inventors, which is incorporated herein by reference in the entirety.

TECHNICAL FIELD

The present disclosure relates generally to precious metal catalysts and, more particularly, to fabrication of precious metal catalysts using a reverse loading and metal shuttling technique.

BACKGROUND

Sustainable energy and environmental concerns are highly important for our society. Further, exhaust emitted from automotive vehicles is harmful to the environment and human health. Therefore, efficient exhaust treatment technologies with high pollutant removal capacity are needed. A current challenge for both industry and academia related to vehicle exhaust treatment is achieving the catalytic removal of typical pollutants (e.g., carbon monoxide-CO, hydrocarbon-HC, nitrogen oxide-NO, or the like) with more than 90% conversion at temperatures below 150° C., which is reflected in a Department of Energy 150° C. Challenge for Exhaust Emissions. Precious metal catalysts or platinum group metals (PGM) such as Pt, Pd and Rh are widely used in automotive exhaust control due to their excellent performance. However, their catalytic performance at low temperature and stability after severe aging is not sufficient to meet increasingly stringent vehicle emission standards in the future.

Currently available tailored synthesis methods that have been developed to stabilize precious metals and other active components may be generally classified into two approaches. The first approach is to chemically anchor precious metals on supports through enhanced strong metal-support interactions. This approach is limited in many practical applications and requires a strong match between the metals and specific supports, which are typically reducible metal oxides that are relatively unstable at high temperatures. The second approach is to create physical barriers (e.g., a core-shell, an overcoating structure, a pore structure, or the like) for confining the precious metals to prevent sintering. However, although this technique may produce stable precious metal catalysts, large-scale industrial application remains a challenge. For example, the catalytic activity is highly dependent on controlled preparation conditions since the coverage of precious metal active sites by other barrier components may occur if the preparation procedures are not well controlled.

Therefore, it may be desirable to provide systems and methods for physically confining the precious metals from sintering at high temperatures while maintaining desired low temperature activity.

SUMMARY

A method is disclosed in accordance with one or more illustrative embodiments of the present disclosure. In one illustrative embodiment, the method includes depositing a precious metal on a base material to form a catalyst structure. In another illustrative embodiment, the method includes performing a first calcination of the catalyst structure. In another illustrative embodiment, the method includes depositing a metal oxide on the catalyst structure, where the precious metal is at least partially encapsulated by the metal oxide. In another illustrative embodiment, the method includes performing a second calcination of the catalyst structure. In another illustrative embodiment, the method includes reducing the catalyst structure with a reductive material, wherein at least a portion of the precious metal diffuses to a surface of the metal oxide to form catalytically active sites.

A catalyst is disclosed in accordance with one or more illustrative embodiments of the present disclosure. In one illustrative embodiment, the catalyst includes a base material. In another illustrative embodiment, the catalyst includes a precious metal. In another illustrative embodiment, the catalyst includes a metal oxide, where at least a portion of the precious metal forms catalytically active sites on a surface of the metal oxide. In another illustrative embodiment, the catalytically active sites are formed by depositing the precious metal on the base material to form a catalyst structure, performing a first calcination on the catalyst structure, depositing the metal oxide on the catalyst structure such that the precious metal is at least partially encapsulated by the metal oxide, performing the second calcination on the catalyst structure, and reducing the catalyst structure with a reductive material such that at least a portion of the precious metal diffuses to a surface of the metal oxide to form the catalytically active sites.

A method is disclosed in accordance with one or more illustrative embodiments of the present disclosure. In one illustrative embodiment, the method includes depositing a precious metal on a base material to form a catalyst structure. In another illustrative embodiment, the method includes performing a first calcination on the catalyst structure. In another illustrative embodiment, the method includes depositing a metal oxide on the catalyst structure, where the precious metal is at least partially encapsulated by the metal oxide. In another illustrative embodiment, the method includes performing a second calcination on the catalyst structure. In another illustrative embodiment, the method includes aging the catalyst structure. In another illustrative embodiment, the method includes reducing the catalyst structure with a reductive material, where at least a portion of the precious metal diffuses to a surface of the metal oxide to form catalytically active sites.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures.

FIG. 2A is a diagrammatic view of the catalyst structure after deposition of a precious metal onto a base material in accordance with one or more embodiments of the present disclosure.

FIG. 2B is a diagrammatic view of the catalyst structure after the first calcination process in accordance with one or more embodiments of the present disclosure.

FIG. 2C is a diagrammatic view of the catalyst structure after the deposition of a metal oxide and a second calcination process in accordance one with or more embodiments of the present disclosure.

FIG. 2D is a diagrammatic view of the catalyst structure after the reduction process in accordance one with or more embodiments of the present disclosure.

FIG. 3A illustrates the performance of precious metal catalysts fabricated directly on an irreducible metal oxide base material upon aging and reduction, in accordance with one or more embodiments of the present disclosure.

FIG. 3B illustrates the performance of precious metal catalysts fabricated directly on a reducible metal oxide upon aging and reduction, in accordance with one or more embodiments of the present disclosure.

DETAILED DESCRIPTION

Figure 1:
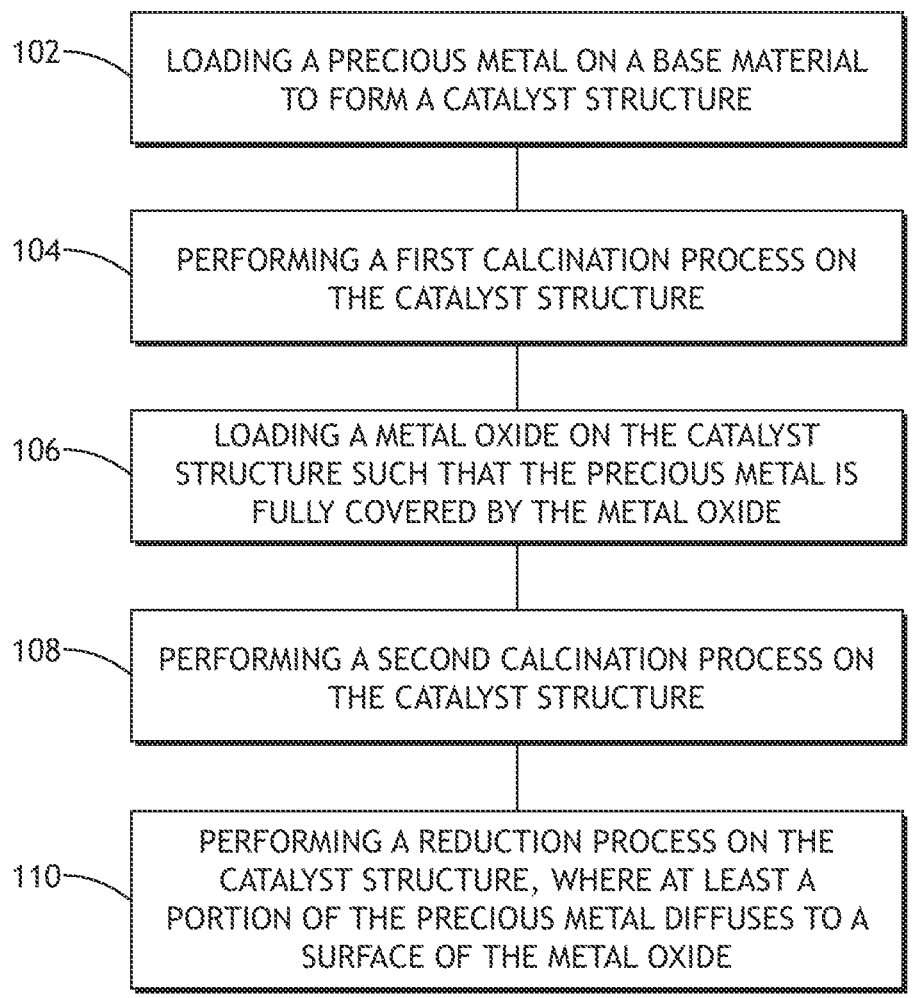
FIG. 1 is a flow diagram illustrating steps performed in a method for fabricating a precious metal catalyst, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to precious metal catalytic structures formed through an inverse loading of precious metals between an irreducible metal oxide and a reducible metal oxide to encapsulate the precious metals followed by reduction activation to shuttle the precious metals to the surface of the reducible metal oxide. The resulting structure exhibits unique catalytically active sites, high thermal stability, and excellent low-temperature catalytic activity. For example, before and after aging, T90 (temperature corresponding to 90% CO conversion) of below 150° C. for CO oxidation on the inverse loaded catalyst may be readily achieved.

It is recognized herein that typical synthesis methods developed to stabilize precious metals and other active components in catalytic structures may suffer from poor low-temperature catalytic activity and/or inadequate thermal stability, particularly under severe aging conditions. For example, chemically anchoring precious metals on supports through enhanced strong metal-support interactions requires a strong match between the specific metals and support materials. However, suitable support materials such as reducible metal oxides may be relatively unstable at high temperatures and may lead to inadequate thermal stability of their supported precious metal catalysts. By way of another example, creating physical barriers to confine the precious metals to prevent them from sintering at high temperatures (e.g., by using core-shell structures, overcoating structures, pore structures, or the like) may increase thermal stability. However, the resulting catalytic activity may be dependent on variations of the fabrication process and may thus not be well-suited for widespread industrial applications.

Embodiments of the present disclosure are directed to depositing precious metals on an irreducible oxide, encapsulating the precious metals with a reducible metal oxide, and performing a reduction activation in which precious metals shuttle through the reducible metal oxide layer and diffuse onto the surface of the reducible metal oxide opposite the irreducible metal oxide. Additional embodiments are directed to resulting catalytic structures formed using such a fabrication process. In contrast with a traditional technique of depositing precious metals directly on a reducible oxide support structure (e.g., using incipient wetness impregnation (IWI)) in which most precious metal anchoring sites are exposed on the support surface, this new technique of fabricating a sandwich-like structure with all initial precious metals encapsulated between reducible metal oxide and irreducible metal oxide layers produced catalysts with much higher low-temperature catalytic activity and substantially better thermal stability upon reduction activation. In this regard, the inverse loading and metal shuttling technique disclosed herein may be a facile, effective, and universal method for the synthesis of superior precious metal catalysts with much higher low-temperature activity and stability compared to conventionally prepared precious metal catalysts. Further, the technique is suitable for fabricating catalysts for wide ranging applications such as, but not limited to, automobile exhaust treatment process (e.g., CO or HC oxidation, NO reduction, or the like), propane dehydrogenation, or acetylene hydrogenation.

It is recognized herein that the reducibility of a metal oxide may generally be related to conditions under which vacancies (e.g., oxygen or metal vacancies) are formed that may facilitate reduction reactions. For the purposes of the present disclosure, the terms reducible metal oxide and irreducible metal oxide are used to refer to metal oxides having a relatively high and relatively low capability to form oxygen vacancies under conditions associated with reduction reactions, respectively. It is contemplated herein that the inverse loading and metal shuttling technique disclosed herein is a facile and flexible technique that may be applied to fabricate catalysts using a wide variety of materials. For example, in the context of the present disclosure, a reducible metal oxide may include, but is not limited to, $CeO_2$, $CeZrO_x$, or $Fe_2O_3$. By way of another example, in the context of the present disclosure, an irreducible metal oxide may include, but is not limited to, $Al_2O_3$, $SiO_2$, MgO, $ZrO_2$, $MgAl_2O_4$, or $La_2O_3$—$Al_2O_3$. By way of a further example, in the context of the present disclosure, a precious metal may include, but is not limited to, precious metals such as Pt, Pd, Rh, Ir, or Au or alloys of these or similar metals.

Referring now to FIGS. 1-7, systems and methods for fabrication of precious metal catalysts are described in greater detail in accordance with one or more embodiments of the present disclosure.

FIG. 1 is a flow diagram illustrating steps performed in a method 100 for fabricating a precious metal catalyst, in accordance with one or more embodiments of the present disclosure. FIGS. 2A-2D illustrate the fabrication of a catalyst structure 202 at various stages of the method 100 in accordance with one or more embodiments of the present disclosure.

In one embodiment, the method 100 includes a step 102 of loading a precious metal 204 onto a base material 206. In another embodiment, the method 100 includes a step 104 of performing a first calcination process on the catalyst structure 202. In this way, the precious metal 204 may be stabilized on the surface of the base material 206.

FIG. 2A is a diagrammatic view of the catalyst structure 202 after deposition of a precious metal 204 onto a base material 206 in accordance with one or more embodiments of the present disclosure. In FIG. 2A, the precious metal 204 is illustrated as a uniform layer. However, it is to be understood that FIG. 2A is provided for illustrative purposes and should not be interpreted as limiting. Rather, the precious metal 204 may be deposited in a uniform or non-uniform layer on the base material 206.

The precious metal 204 may be loaded onto the base material 206 in step 102 using any technique known in the art. In one embodiment, the precious metal 204 is loaded onto the base material 206 using incipient wetness impregnation (IWI). For example, a solution including the precious metal 204 and a precursor material may be deposited onto the base material 206. Accordingly, the precursor material may then be decomposed during the first calcination process 104 to provide a stable precious metal 204 on the surface of the base material 206.

The base material 206 may include any material suitable for providing structural, chemical, and/or thermal support for the catalyst structure 202. Further, the base material 206 may be inert or may be inactive with respect to any catalytic reactions. In some embodiments, the base material 206 is an irreducible metal oxide such as, but not limited to, $Al_2O_3$, $SiO_2$, MgO, or $ZrO_2$. An irreducible metal oxide may provide high thermal and/or chemical stability in the expected operational conditions of exhaust catalysis. For example, support structures formed from $CeO_2$ loaded onto $Al_2O_3$ as a base material have been shown to have better low-temperature catalytic activity and thermal stability than bulk $CeO_2$ alone as a support structure. In this regard, both the thermal stability of the $Al_2O_3$ base material and the catalytic activity of the $CeO_2$ may be exploited. However, it is to be understood that any base material suitable for use as a support in a catalyst structure is within the spirit and scope of the present disclosure. For example, the base material may include, but is not limited to, carbon-based materials or zeolites.

Further, the base material 206 may generally be formed from any number of materials. In some embodiments, the base material 206 is formed as a single oxide support (e.g., formed from a single material). In some embodiments, the base material 206 is formed as a mixed oxide support and may include two or more materials including, but not limited to, two or more irreducible oxides. For example, the mixed base material may include, but is not limited to, MgO—$Al_2O_3$, $MgAl_2O_4$, $ZnAl_2O_4$, or $La_2O_3$—$Al_2O_3$.

The precious metal 204 may include any precious metal or platinum group metal known in the art suitable for catalysis. For example, the precious metal 204 may include Pt, Pd, Rh, Ir, or Au, or their alloys. The precursor material used for precious metal 204 may include any salt containing precious metal. For example, the precious metal precursor may include, but is not limited to, platinum nitrate, platinum chloride, or Tetraamineplatinum(II) nitrate.

The first calcination process in step 104 may include heating the catalyst structure 202 under any conditions suitable for increasing the catalytic activity of the precious metal 204. In some embodiments, the step 104 includes heating the catalyst structure 202 in an atmosphere including oxygen (e.g., standard atmosphere, an oxygen-enriched atmosphere, or the like) or inert gas (e.g., nitrogen, argon, helium, or the like). Further, it is recognized herein that the temperature and duration of the calcination in step 104 may be adjusted based on the specific materials used for the precious metal 204 and/or the base material 206. In some embodiments, the calcination in step 104 includes heating at temperatures greater than 550° C. For example, the calcination steps may include heating a temperature in the range of 550 to 1050° C. By way of another example, the calcination in step 104 may include heating at a temperature around 800° C., which is similar to industry-accepted aging procedures. In a general sense, the first calcination process in step 104 may include heating for any duration such as, but not limited to, at least one hour.

FIG. 2B is a diagrammatic view of the catalyst structure 202 after the first calcination process in step 104 in accordance with one or more embodiments of the present disclosure. As illustrated in FIG. 2B, the first calcination process in step 104 may decompose the precursor material from step 102 and leave behind stable structures of the precious metal 204 (here illustrated as mounds). However, it is to be understood that FIG. 2B is provided for illustrative purposes and should not be interpreted as limiting. Rather, it is contemplated herein that the precious metal after the first calcination process in step 104 may have a variety of structures including, but not limited to, a thin film or a distribution of separate structures. In a general sense, the specific structure of the precious metal 204 after the first calcination process in step 104 may depend on the selected conditions for step 104 such as, but not limited to, the temperature and duration of the heating.

In another embodiment, the method 100 includes a step 106 of loading a metal oxide 208 on the catalyst structure 202, where the precious metal 204 is fully covered by the metal oxide 208. In this regard, the precious metal 204 may be fully encapsulated by the metal oxide 208. In another embodiment, the method 100 includes a step 108 of performing a second calcination process on the catalyst structure 202.

The metal oxide 208 may be loaded on the catalyst structure 202 using any technique known in the art including, but not limited to, an IWI process. For example, a solution of the metal oxide 208 and a precursor solution may be deposited onto the catalyst structure 202 such that the precious metal 204 on the base layer 206 is encapsulated.

The metal oxide 208 loaded onto the base material 206 may include any type of metal oxide 208 suitable for use as a support in a catalyst structure 202. In some embodiments, the metal oxide 208 loaded onto the base material 206 includes a reducible metal oxide. For example, the reducible metal oxide may include, but is not limited to, ceria, iron oxide, manganese oxide, or copper oxide. By way of another example, the reducible metal oxide may include a mixed oxide such as, but not limited to, ceria-zirconia, copper-cerium oxide, iron-cobalt oxide, or perovskite-type oxide. As described previously herein, reducible metal oxides may operate well as support materials for precious metal catalysts, particularly for low-temperature operation (e.g., at or below 150° C.). However, it is to be understood that any metal oxide 208 suitable for use as a support in a catalysis structure is within the spirit and scope of the present disclosure.

The second calcination process in step 108 may be substantially similar to the first calcination process in step 104. Accordingly, the description of the step 104 may be generally applicable to the step 108. The second calcination process in step 108 may thus include heating the catalyst structure 202 in any conditions suitable for increasing the catalytic activity of the catalyst structure 202. For example, the calcination step in step 108 may include, but is not limited to, heating the catalyst structure 202 in an oxygen atmosphere at a temperature in the range of 550 to 1050° C. for at least one hour.

FIG. 2C is a diagrammatic view of the catalyst structure 202 after the second calcination process in step 108 in accordance one with or more embodiments of the present disclosure. As illustrated in FIG. 2C, the second calcination process in step 108 may decompose the precursor material from step 106 and leave behind a stable structure of the metal oxide 208. For example, FIG. 2C illustrates a non-uniform structure of the metal oxide 208 encapsulating the precious metal 204. However, it is to be understood that FIG. 2C is provided for illustrative purposes and should not be interpreted as limiting. Rather, it is contemplated herein that the precious metal after the second calcination process in step 108 may have a variety of structures including, but not limited to, a thin film or a distribution of separate structures. In a general sense, the specific structure of the precious metal 204 after the first calcination process in step 104 may depend on the selected conditions for step 104 such as, but not limited to, the temperature and duration of the heating. Further, although it is preferred that the metal oxide 208 fully encapsulate the precious metal 204 on the surface of the base material 206, this is not a strict requirement. Rather, it is contemplated herein that some of the benefits of encapsulation as disclosed herein may not be available in localized areas in which the precious metal 204 is not fully encapsulated. However, the resulting catalyst structure 202 as a whole may still be within the spirit and scope of the present disclosure.

In another embodiment, the method 100 includes a step 110 of performing a reduction process on the catalyst structure, where at least a portion of the precious metal 204 diffuses (e.g., shuttles) to a surface of the metal oxide 208 to form stable catalytically active sites 210. In this regard, the step 110 may operate as a reduction and activation step.

FIG. 2D is a diagrammatic view of the catalyst structure 202 after the reduction process in step 110 in accordance one with or more embodiments of the present disclosure. As illustrated in FIG. 2D, the reduction process in step 110 may induce diffusion of at least a portion of the precious metal 204 on the base material 206 to diffuse through the metal oxide 208 to a surface of the 208, which results in catalytically-active sites 210 on the surface of the metal oxide 208. The diffusion of precious metal may be induced by the diffusion of lattice oxygen within metal oxide 208, which was derived from the consumption of surface oxygen within the 208 during reduction process in step 110. Additionally, the reduction process may introduce vacancies and/or defects in the catalyst structure 202 that may further increase the catalytic activity of the catalyst structure 202.

For example, the reduction process in step 110 may include reducing the catalyst structure with a reductive gas such as, but not limited to, a gas including, but not limited to, $H_2$, CO, $CH_4$, $C_3H_6$, or $C_3H_8$. Further, the reductive gas may include a pure reductive gas or a gas mixture including a reductive gas and an inert gas. In this regard, the concentration of the reductive gas may be controlled. Additionally, the reduction process in step 110 may include, heating the catalyst structure in the reductive gas. For example, the step 110 may include heating the catalyst structure in the reductive gas at a temperature in the range of 200-900° C. for at least an hour. However, it is to be understood that this particular temperature range and duration is provided solely for illustrative purposes and should not be interpreted as limiting. Rather, the step 110 may include reducing the catalyst with a reductive gas under any conditions suitable for inducing diffusion of the precious metal 204 from the surface of the base material 206 or otherwise increasing the catalytic activity of the catalyst structure 202.

In another embodiment, though not shown, the method 100 includes a step of aging the catalyst structure after the second calcination process in step 108 and the reduction process in step 110. For example, it is contemplated herein that in some cases the precious metal 204 may diffuse, coalesce, or sinter after periods of use and/or exposure to high temperatures, particularly if a controlled aging process has not been performed. Accordingly, the method 100 may include a controlled aging process to further stabilize the catalyst structure and minimize any associated loss in performance, upon use in a desired environment. For example, the aging process may include heating the catalyst structure 202 under any conditions suitable for stabilizing and/or controlled aging the catalyst structure 202 in conditions of oxidative (containing oxygen) or reductive (containing reductive gas like $H_2$, CO, $CH_4$, $C_3H_6$, or $C_3H_8$) atmosphere at a temperature in the range of 550 to 1050° C.

It is contemplated herein that forming catalytically active sites 210 using this reverse loading and metal shuttling technique may form thermally stable sites that resist sintering at high temperatures. Compared to active sites generated on a catalyst through conventional techniques (e.g., a reference catalyst as described herein), relatively small and uniform precious metal sites 210 may be generated on metal oxide 208 on catalysts generated in accordance with the present disclosure (e.g., the catalyst structure 202). Additionally, catalyst fabrication using the inverse shuttling method disclosed herein may form strong metal support interaction (SMSI) between active sites 210 and the metal oxide 208. Accordingly, such a structure with uniform active sites and strong SMSI as disclosed herein may be suitable for industrial adoption in a wide range of applications including, but not limited to automotive exhaust applications. It is further contemplated herein that the base material 206, the metal oxide 208, and the precious metal 204 may include any combination of materials known in the art suitable for use in catalysis. Further, the base material 206, the metal oxide 208, and/or the precious metal 204 may be selected to provide desired structural and/or chemical properties.

Referring now to FIGS. 3A and 3B, catalysts formed using precious metals deposited directly on irreducible and reducible metal oxide supports are described as a contrast to the systems and methods disclosed herein. FIG. 3A is a diagrammatic view of a catalyst 302 fabricated directly on an irreducible metal oxide base material 206 upon aging and reduction. FIG. 3B is a diagrammatic view of a catalyst 304 fabricated on a reducible metal oxide base material 206 supported by an irreducible metal oxide base material 206 upon aging and reduction. In both FIGS. 3A and 3B, precious metal 204 on the surface of either the irreducible metal oxide base material 206 or the reducible metal oxide 208 diffuse and/or sinter into larger features upon aging and reduction.

In contrast with the catalysts formed using precious metals deposited directly on irreducible and reducible metal oxide supports as illustrated in FIGS. 3A and 3B, it is contemplated herein that a catalyst structure 202 prepared using method 100 (e.g., as illustrated in FIGS. 2A-2D) may provide excellent thermal stability, even under severe aging conditions. In particular, the precious metal 204 at the catalytically active sites 210 of the catalyst structure 202 illustrated in FIG. 2D fabricated according to the method 100 remain stable, even under severe aging and reduction. Further, combining the precious metal 204 with a reducible metal oxide 208 may facilitate high catalytic activity at low temperatures (e.g., at or below 150° C.). In particular, a catalyst structure 202 prepared in accordance with the present disclosure may reduce diffusion and/or sintering of the precious metal 204 upon aging and reduction.

Referring now to FIGS. 4-7, the performance of catalyst structures fabricated according to method 100 is described in greater detail. In particular, FIGS. 4-7 illustrate evidence under both ex situ and in situ reaction conditions that the reduction activation process of step 110 of the precious metal 204 diffuses through the metal oxide 208 to the surface of the metal oxide 208 to form unique catalytically active sites 210. It is contemplated herein that this technique for forming a catalyst structure 202 is new in both academia and industry.

In particular, FIGS. 4-7 illustrate the characteristics and performance of three catalysts, an inverse loaded catalyst fabricated according to method 100 and two reference catalysts ("reference catalyst 1" and "reference catalyst 2") fabricated using traditional techniques. For example, the inverse loaded catalyst may correspond to the catalyst structure 202 illustrated in FIGS. 2A-2D.

The inverse loaded catalyst (e.g., catalyst structure 202) for activity testing is an activated fresh and aged $CeO_2/Pt/Al_2O_3$ catalyst structure fabricated by following steps according to method 100:
1. IWI of Pt precursor onto $\gamma$-$Al_2O_3$ (e.g., step 102) followed by calcination (e.g., step 104) at 550° C. for 2 h, resulting in $Pt/Al_2O_3$.
2. IWI of $Ce(NO_3)_3$ onto $Pt/Al_2O_3$ (e.g., step 106), followed by calcination (step 108) at 550° C. for 2 h to generate $CeO_2/Pt/Al_2O_3$.
3. The aged $CeO_2/Pt/Al_2O_3$ is obtained by high temperature calcination at 800° C. for 12 h in air.
4. The inverse loaded catalyst is obtained after reducing the fresh and aged $CeO_2/Pt/Al_2O_3$ in $H_2$/Ar flow at 400° C. for 0.5 h.

The reference catalyst 1 for activity testing is an activated fresh and aged $Pt/CeO_2/Al_2O_3$ catalyst structure fabricated using the following steps:
1. IWI of $Ce(NO_3)_3$ onto $\gamma$-$Al_2O_3$ followed by calcination at 550° C. for 2 h to generate $CeO_2/Al_2O_3$.
2. IWI of Pt precursor onto $CeO_2/Al_2O_3$ support, followed by calcination at 550° C. for 2 h to generate $Pt/CeO_2/Al_2O_3$.
3. The aged $Pt/CeO_2/Al_2O_3$ is obtained by high temperature calcination at 800° C. for 12 h in air.
4. The reference catalyst 1 is obtained after reducing the fresh and aged $Pt/CeO_2/Al_2O_3$ in $H_2$/Ar flow at 400° C. for 0.5 h.

The reference catalyst 2 (used only for characterization) is a $Pt/Al_2O_3$ catalyst structure fabricated using the following step:
1. IWI of Pt precursor onto $\gamma$-$Al_2O_3$ followed by calcination at 550° C. for 2 h to generate $Pt/Al_2O_3$.

The catalytic performance of the catalysts was characterized using a steady-state CO oxidation reaction under the following conditions: 1 vol. % CO+1 vol. % $O_2$ (Ar balance) with a weight hourly space velocity WHSV=200,000 mL/(g h).

Figure 4:
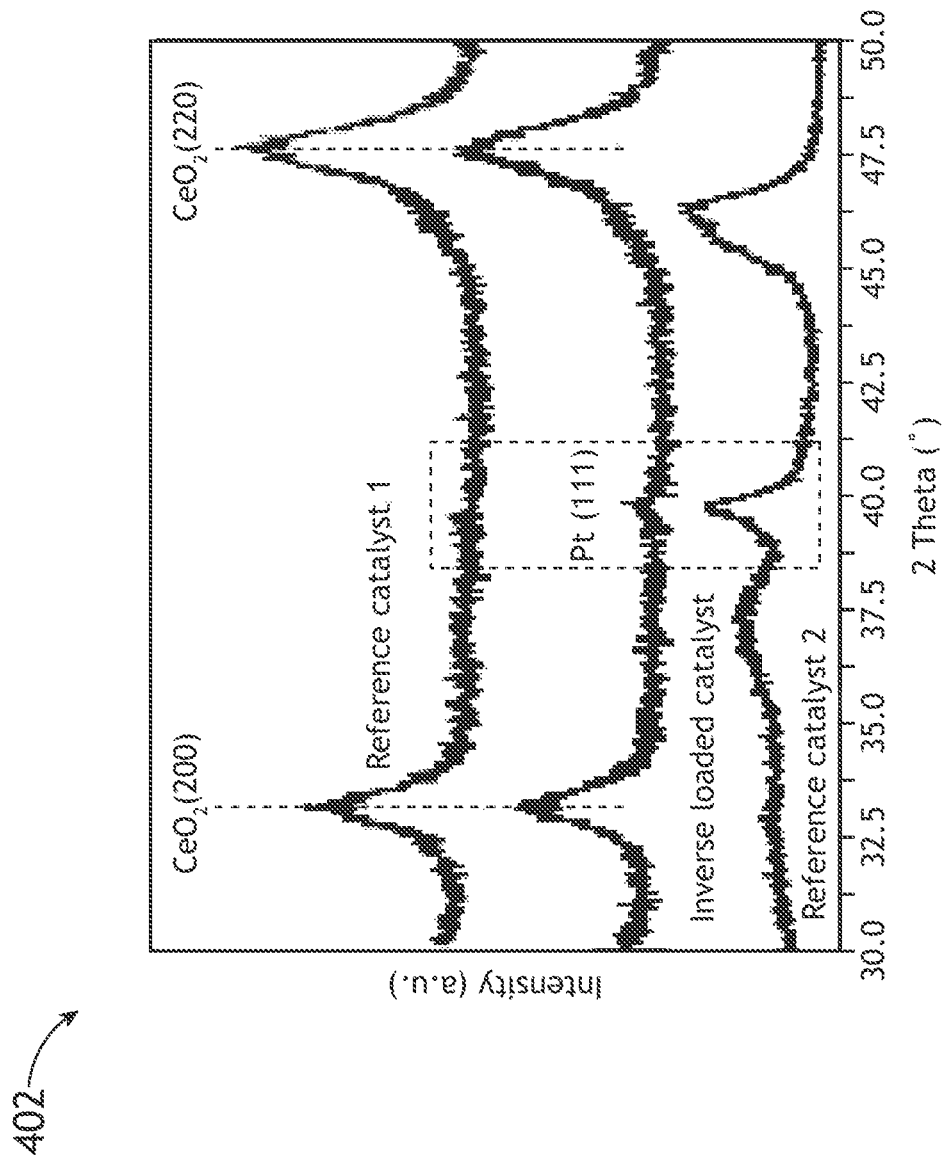
FIG. 4 is a plot of X-Ray Diffraction (XRD) patterns for the catalysts under test, in accordance with one or more embodiments of the present disclosure.

FIG. 4 is a plot 402 of X-Ray Diffraction (XRD) patterns for the three catalysts under test, in accordance with one or more embodiments of the present disclosure. As illustrated in FIG. 4, the XRD patterns of both the inverse loaded catalyst and reference catalyst 1 could be well indexed to a mixture phase of cubic fluorite $CeO_2$ and $\gamma$-$Al_2O_3$, while a mixture phase of metallic Pt and $\gamma$-$Al_2O_3$ was detected on reference catalyst 2. A similar $CeO_2$ crystalline size was found on both the inverse loaded catalyst and the reference catalyst 1. However, a metallic Pt nanoparticle was present on the inverse loaded catalyst (e.g., the Pt (111) peak), which suggests that a relatively large concentration of Pt nanoparticles was still present after the reverse loading of $CeO_2$ onto $Pt/Al_2O_3$. In contrast, for Reference catalyst 1, the Pt diffraction peak was not observed for reference catalyst 1, indicating a high-dispersion state of Pt species on this sample.

Figure 5:
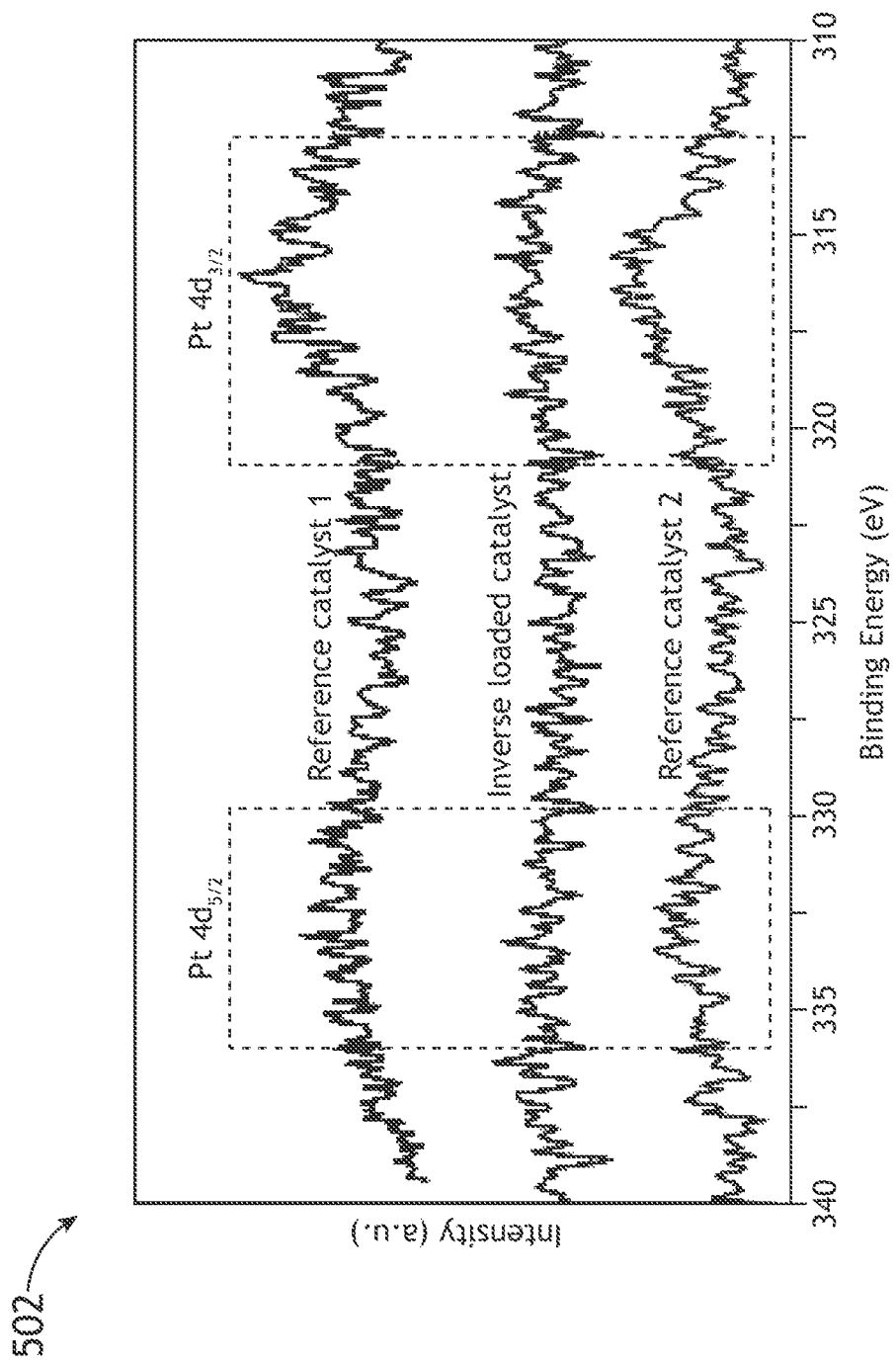
FIG. 5 is a plot of X-Ray Photoelectron Spectra (XPS) for the catalysts under test, in accordance with one or more embodiments of the present disclosure.

FIG. 5 is a plot 502 of X-Ray Photoelectron Spectra (XPS) for the catalysts under test, in accordance with one or more embodiments of the present disclosure. No apparent Pt species was observed on the inverse loaded catalyst, implying that the Pt species were well covered by loaded $CeO_2$, and the sandwich-like catalyst structure was indeed formed ($CeO_2/Pt/Al_2O_3$). In contrast, Pt species were observed on both the reference catalyst 1 and the reference catalyst 2.

Figure 6:
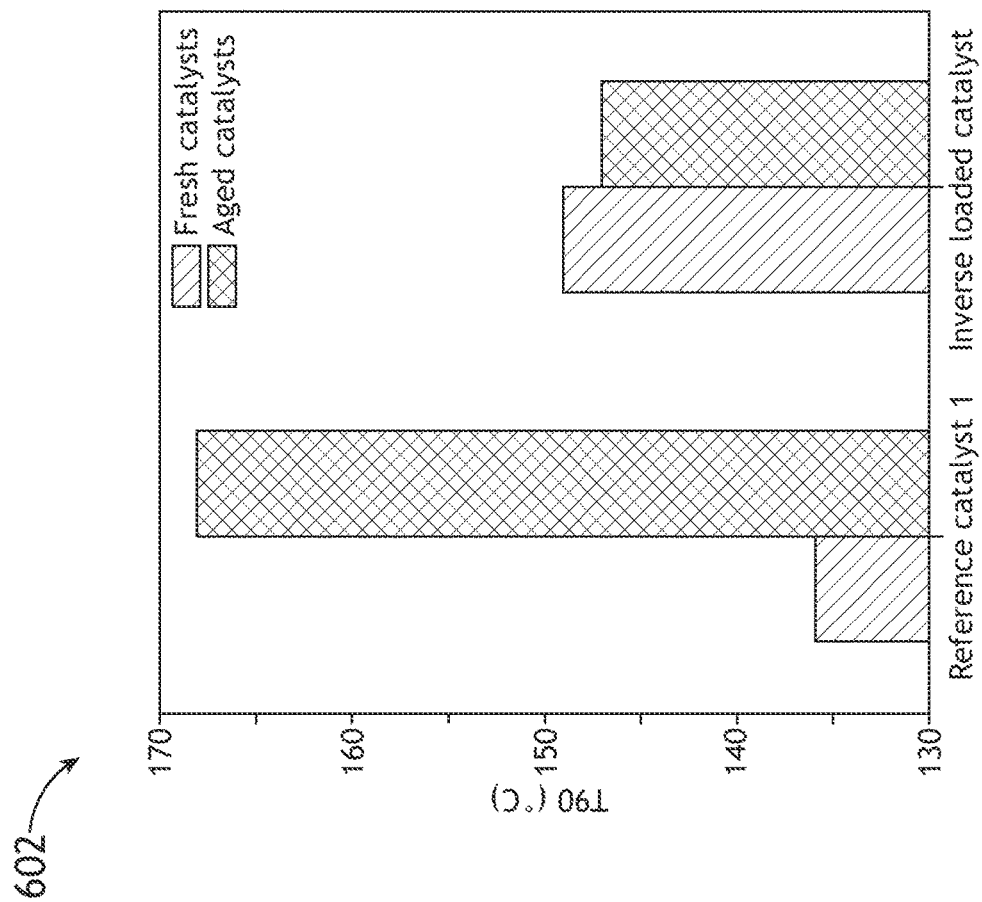
FIG. 6 is a bar chart of catalytic CO oxidation performance of catalysts before and after aging, in accordance with one or more embodiments of the present disclosure.

FIG. 6 is a bar chart 602 of catalytic CO oxidation performance of the inverse loaded catalyst and reference catalyst 1 before and after aging, in accordance with one or more embodiments of the present disclosure. The aging was performed by heating the catalysts in an atmosphere including oxygen (e.g., air) at 800° C. for 12 hours. Prior to the CO oxidation test, each catalyst was pretreated in 10% $H_2$/Ar flow at 400° C. for 0.5 h. T90 refers to the temperature at which CO conversion achieved 90%. As illustrated in FIG. 6, an obvious increase of T90 (indicating poorer performance) was observed for reference catalyst 1 after aging at 800° C. for 12 h relative to the fresh sample, while the inverse loaded catalyst exhibited a slightly lower T90 (indicating improved performance) after aging under the same conditions. In this regard, the inverse loaded catalyst generated via method 100 (e.g., reverse loading and precious metal shuttling upon reduction activation) showed superior thermal stability over the catalyst prepared from a conventional method (e.g., reference catalyst 1).

Figure 7:
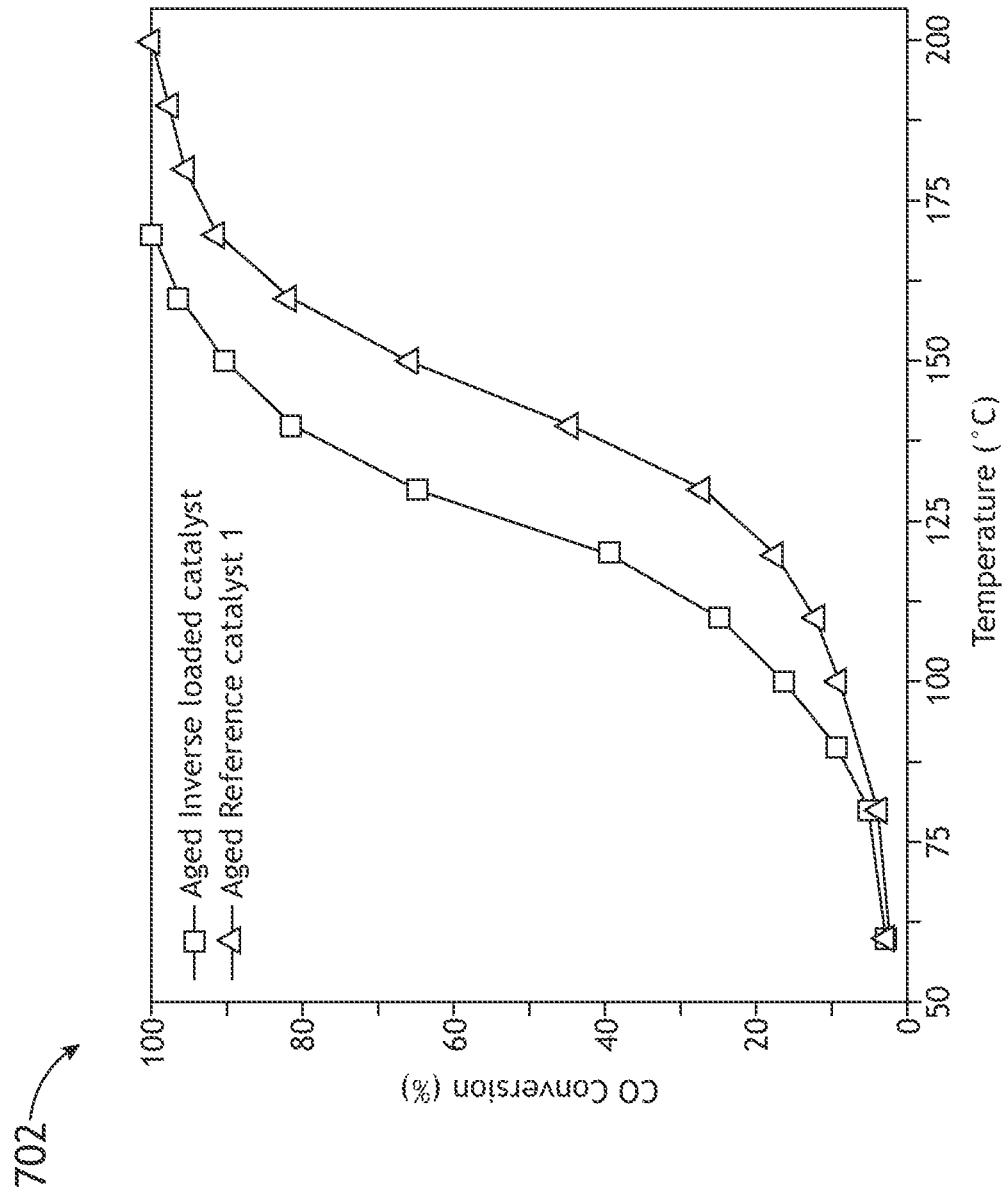
FIG. 7 is a plot of CO oxidation activity on catalysts after aging under air condition at 800° C. for 12 h, in accordance with one or more embodiments of the present disclosure.

FIG. 7 is a plot 702 of CO oxidation activity on catalysts after aging under air condition at 800° C. for 12 h, in accordance with one or more embodiments of the present disclosure.

As illustrated in FIG. 7, the aged inverse loaded catalyst exhibited much better CO oxidation activity than aged reference catalyst 1. Accordingly, the inverse loaded catalyst generated via method 100 not only exhibited superior thermal stability relative to the reference catalyst 1 prepared by a conventional method, but also showed much higher catalytic activity. In this regard, the novel and unique reverse loading and precious metal shuttling disclosed herein is able to generate highly stable and active precious metal catalysts for automobile exhaust treatment application as well as for other catalytic reactions involving precious metals as active sites.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A method comprising:
    depositing a precious metal onto a surface of a base material to form a catalyst structure, wherein the base material comprises at least one of a first metal oxide or an inert material;
    performing a first calcination of the catalyst structure to form one or more structures of the precious metal on the base material;
    depositing a second metal oxide on the catalyst structure, wherein the one or more structures of the precious metal are at least partially encapsulated by the second metal oxide;
    performing a second calcination of the catalyst structure to generate a layer of the second metal oxide; and
    reducing the catalyst structure with a reductive material to induce a reduction reaction in the second metal oxide and induce diffusion of at least a portion of the precious metal to a surface of the second metal oxide to form catalytically active sites.

2. The method of claim 1, wherein the second metal oxide comprises:
    at least one of a single metal oxide or a mixed metal oxide.

3. The method of claim 1, wherein the second metal oxide comprises:
    at least one of ceria, iron oxide, manganese oxide, or copper oxide, ceria-zirconia, copper-cerium oxide, or iron-cobalt oxide.

4. The method of claim 1, wherein
    the first metal oxide is less reducible than the second metal oxide.

5. The method of claim 4, wherein the first metal oxide comprises:
    at least one of a single metal oxide support or a mixed oxide support.

6. The method of claim 1, wherein the base material comprises:
    at least one of $Al_2O_3$, $SiO_2$, MgO, $ZrO_2$, $MgAl_2O_4$, or $La_2O_3$—$Al_2O_3$.

7. The method of claim 1, wherein the precious metal comprises:
    at least one of Pt, Pd, Rh, Ir, Au, or a precious metal alloy.

8. The method of claim 1, wherein at least one of the first calcination or the second calcination comprises:
    heating the catalyst structure in an atmosphere including oxygen.

9. The method of claim 8, wherein heating the catalyst structure in the atmosphere including oxygen comprises:
    heating the catalyst structure in an atmosphere including oxygen at a temperature ranging from 550° C. to 1050° C.

10. The method of claim 8, wherein heating the catalyst structure in an atmosphere including oxygen comprises:
    heating the catalyst structure in an atmosphere including oxygen for at least an hour.

11. The method of claim 1, wherein reducing the catalyst structure with the reductive material comprises:
    reducing the catalyst structure with a reductive gas.

12. The method of claim 11, wherein reducing the catalyst structure with the reductive gas comprises:
    heating the catalyst structure in a reductive gas at a temperature ranging from 200° C. to 900° C.

13. The method of claim 11, wherein the reductive gas comprises:
    at least one of a pure reductive gas or a gas mixture including a reductive gas and an inert gas.

14. The method of claim 11, wherein the reductive material includes at least one of $H_2$, CO, $CH_4$, $C_3H_6$, or $C_3H_8$.

15. A method comprising:
    depositing a precious metal onto a surface of a base material to form a catalyst structure, wherein the base material comprises at least one of an first metal oxide or an inert material;
    performing a first calcination on the catalyst structure to form one or more structures of the precious metal on the base material;
    depositing a second metal oxide on the catalyst structure, wherein the one or more structures of the precious metal are at least partially encapsulated by the second metal oxide;
    performing a second calcination on the catalyst structure to generate a layer of the second metal oxide;
    aging the catalyst structure; and
    reducing the catalyst structure with a reductive material to induce a reduction reaction in the second metal oxide and induce diffusion of at least a portion of the precious metal diffuses to a surface of the second metal oxide to form catalytically active sites.

16. The method of claim 15, wherein aging the catalyst structure comprises:
    heating the catalyst structure in conditions of an oxidative atmosphere.

17. The method of claim 15, wherein aging the catalyst structure comprises:
    heating the catalyst structure in conditions of a reductive atmosphere.

18. The method of claim 17, wherein the reductive atmosphere includes at least one of $H_2$, CO, $CH_4$, $C_3H_6$, or $C_3H_8$.

19. The method of claim 15, wherein the first metal oxide is less reducible than the second metal oxide.

* * * * *